United States Defensive Publication [19] (H) [11] T953,010

Koldenhoven [43] Dec. 7, 1976

[54] HERBICIDAL COMBINATIONS AND METHOD OF CONTROLLING WEEDS IN CROPS

[75] Inventor: Edwin Frank Koldenhoven, Middleport, N.Y.

[73] Assignee: FMC Corporation, New York, N.Y.

[21] Appl. No.: 680,995

[22] Filed: Apr. 28, 1976

Related U.S. Application Data

[63] Continuation of Ser. No. 542,133, Jan. 17, 1975, abandoned.

[51] Int. Cl.[2] ..... A01N 9/22

[52] U.S. Cl. ..... 71/93; 71/88; 71/115; 71/120

[57] ABSTRACT

Herbicidal r-2-alkyl-5-alkyl-c-5-(2-substituted-benzyloxy)-1,3-dioxanes used in combination with certain crop herbicides, e.g. metribuzin, reduce the injury to the crop while maintaining satisfactory control of broad-leaved weeds and improving control over undesired grasses. The invention is exemplified by the control of weeds in soybeans by the combination of a dioxane with metribuzin.

10 Claims, No Sheets Drawing,

12 Pages Specification

The file of this unexamined application may be inspected and copies thereof may be purchased (849 O.G. 1221, Apr. 9, 1968).